J. F. DAVENPORT.
LID FOR CULINARY VESSELS.
APPLICATION FILED JUNE 8, 1914.

1,145,231. Patented July 6, 1915.

Inventor
John F. Davenport.

UNITED STATES PATENT OFFICE.

JOHN F. DAVENPORT, OF STOUGHTON, WISCONSIN.

LID FOR CULINARY VESSELS.

1,145,231.   Specification of Letters Patent.   Patented July 6, 1915.

Application filed June 8, 1914. Serial No. 843,713.

*To all whom it may concern:*

Be it known that I, JOHN F. DAVENPORT, a citizen of the United States, residing at Stoughton, in the county of Dane and State of Wisconsin, have invented certain new and useful Improvements in Lids for Culinary Vessels, of which the following is a specification.

This invention relates to jars, crocks, bowls or other culinary vessels, and its object is to provide a lid for the same having novel and improved means whereby such lid may be firmly clamped on the vessel to effect a tight closure. A bail is also provided to facilitate the handling of the vessel. This object is attained by means of a combination and arrangement of parts to be hereinafter described and claimed, reference being had to the accompanying drawing, in which—

Figure 1:
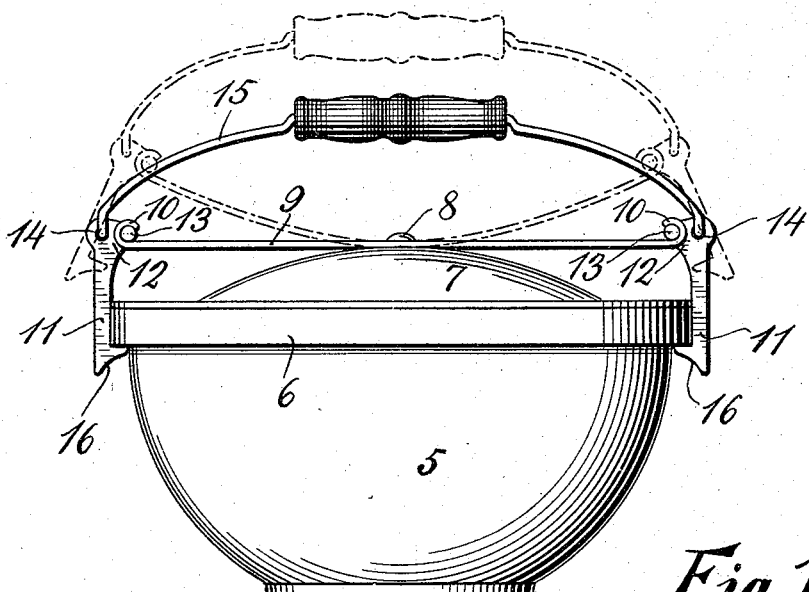
Figure 2:
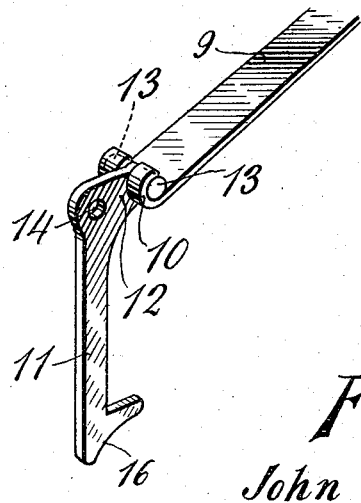

Figure 1 is a side elevation showing the application of the invention, and Fig. 2 is a perspective view showing one end of the device.

Referring specifically to the drawing, 5 denotes an earthenware bowl or other culinary vessel to which the invention is applied. At the top of the bowl is an external bead or flange 6. The lid of the bowl is indicated at 7, the same being shaped to seat on the top edge of the bowl and having a central arched portion. To the center of the lid is riveted or otherwise fastened, as indicated at 8, a resilient metal strip 9. This strip projects radially from the center of the lid in opposite directions and has at each of its free ends a bifurcated hook 10. To the free ends of the strip are pivotally connected hooks 11 designed to be slipped under the bead 6 to engage the same. The shanks of the hooks have lateral extensions 12 provided at their extremities, on opposite sides, with outstanding trunnion lugs 13 over which the hooks 10 are slipped, whereby the connections between the hooks 11 and the strip 9 are made. The hooks 10 are bifurcated in order that they may straddle the parts 12. At the top of the shanks of the hooks 11, back of the lugs 13, are eyes 14 for attachment of a bail 15.

The strip 9 is so tensioned that its normal tendency is to spring outward at its ends from the top of the lid 7 as shown dotted in Fig. 1. Hence, in order to fasten the lid in place on the vessel, it is necessary to force the ends of the strip downward to bring the hooks 11 under the bead 6, and when the hooks are thus placed, the lid is firmly pressed down on the vessel by the spring action of the strip 9, and held in place by the hooks 11. The release of the lid is readily effected by disengaging the hooks 11 from the bead 6, which action is facilitated by providing said hooks with finger-holds 16. The vessel may be carried by using the bail 15 without danger of the hooks 11 slipping off the bead 6. The heavier the suspended weight, the tighter will the hooks grip the bead.

The device is most useful in connection with butter crocks and preserve jars. When these are placed in a cooler their contents are not affected by the odors from the contents of other vessels in the cooler.

I claim:

1. The combination with a vessel having an external bead at the top; of a lid for said vessel, a resilient member secured to the top of the lid at the center thereof, said member having a normal tendency to spring outward at its free ends from the lid, hooks connected to the free ends of the member and engageable with the aforesaid bead, and a bail connected to the hooks back of the connection between the hooks and the resilient member.

2. The combination with a vessel having an external bead at the top; of a lid for said vessel, a resilient member secured to the top of the lid at the center thereof, said member having a normal tendency to spring outward at its free ends from the lid, hooks engageable with the aforesaid beads, the shanks of said hooks having lateral extensions provided on opposite sides with trunnion lugs, and the free ends of the resilient member having hooks engaging said lugs, the aforesaid lateral extensions having eyes located back of the trunnions, and a bail connected to the eyes.

In testimony whereof I affix my signature in presence of two witnesses.

JOHN F. DAVENPORT.

Witnesses:
B. T. McDONALD, Jr.,
E. J. FALK.

Copies of this patent may be obtained for five cents each, by addressing the "Commissioner of Patents, Washington, D. C."